(12) United States Patent
Li et al.

(10) Patent No.: US 6,925,521 B2
(45) Date of Patent: Aug. 2, 2005

(54) SCHEME FOR IMPLEMENTING BREAKPOINTS FOR ON-CHIP ROM CODE PATCHING

(75) Inventors: Hsiao Yi Li, Plano, TX (US); Ryan G. Mueller, Plano, TX (US); Steve K. Tsang, McKinney, TX (US)

(73) Assignee: Texas Instruments Incorporated, Dallas, TX (US)

(*) Notice: Subject to any disclaimer, the term of this patent is extended or adjusted under 35 U.S.C. 154(b) by 344 days.

(21) Appl. No.: 10/229,674

(22) Filed: Aug. 28, 2002

(65) Prior Publication Data

US 2003/0051119 A1 Mar. 13, 2003

Related U.S. Application Data

(60) Provisional application No. 60/318,647, filed on Sep. 10, 2001.

(51) Int. Cl.[7] .............................................. G06F 12/00
(52) U.S. Cl. ....................................... 711/103; 711/156
(58) Field of Search ................................ 711/154, 102, 711/165, 202, 103, 156; 712/244, 245

(56) References Cited

U.S. PATENT DOCUMENTS

| | | | |
|---|---|---|---|
| 4,028,678 A | | 6/1977 | Moran |
| 4,028,684 A | * | 6/1977 | Divine et al. ................ 711/115 |
| 4,141,068 A | * | 2/1979 | Mager et al. ................ 711/103 |
| 4,400,798 A | | 8/1983 | Francis et al. |
| 4,542,453 A | | 9/1985 | Patrick et al. |
| 4,603,399 A | | 7/1986 | Cheek et al. |
| 5,481,713 A | | 1/1996 | Wetmore et al. |
| 5,493,674 A | | 2/1996 | Mizutani et al. |
| 5,546,586 A | | 8/1996 | Wetmore et al. |
| 5,619,698 A | | 4/1997 | Lillich et al. |
| 5,757,690 A | | 5/1998 | McMahon |
| 5,938,766 A | | 8/1999 | Anderson et al. |
| 5,983,337 A | | 11/1999 | Mahalingaiah et al. |
| 6,073,252 A | | 6/2000 | Moyer et al. |
| 6,076,134 A | | 6/2000 | Nagae |
| 6,128,751 A | | 10/2000 | Yamamoto et al. |
| 6,141,740 A | | 10/2000 | Mahalingaiah et al. |
| 6,154,834 A | | 11/2000 | Neal et al. |
| 6,158,018 A | | 12/2000 | Bernasconi et al. |
| 6,260,157 B1 | | 7/2001 | Schurecht et al. |
| 6,438,664 B1 | * | 8/2002 | McGrath et al. ............ 711/154 |
| 2003/0084229 A1 | * | 5/2003 | Ho et al. .................... 711/102 |
| 2003/0217227 A1 | * | 11/2003 | Parthasarathy et al. ..... 711/118 |
| 2004/0049667 A1 | * | 3/2004 | McCormick et al. ....... 712/233 |

* cited by examiner

*Primary Examiner*—Pierre-Michel Bataille
(74) *Attorney, Agent, or Firm*—J. Dennis Moore; W. James Brady, III; Frederick J. Telecky, Jr.

(57) ABSTRACT

The present invention relates to a system and a method for preventing address conflicts when establishing breakpoints and applying one or more patches to code residing on a read only memory (ROM) device. The system and method generally comprises identifying one or more program addresses which require patching, whereby one or more patch addresses are defined; evaluating address bits of the patch addresses and determining index bit positions, whereby address bits occupying the index bit positions define one or more unique tag indices; and storing the index bit positions in a tag programming memory. The system and method may furthermore comprise storing the one or more tag indices and a respectively associated one or more tag addresses in a tag control memory, forming a program index for each program address; associating each program index to a tag index; comparing the tag address associated with the tag index for each matched program index to a predetermined portion of the program address via a comparison circuit; and directing the code to patch instruction data associated with the patch address in a patch memory if the predetermined portion of the program address matches the tag address. The system and method may further comprise a RAM/ROM enable circuit operable to direct the code to the patch memory if the program address originates from the patch memory.

45 Claims, 7 Drawing Sheets

| PATCH ADDRESS | PATCH | TAG INDEX | TAG ADDRESS |
|---|---|---|---|
| 1011001000110010 | 0 | 0000 | 101100100111 |
| 1011001100110011 | 1 | 0001 | 101100110111 |
| 1100101000000110 | 2 | 0010 | 110010100111 |
| 1110110101100101 | 3 | 0011 | 111011011100 |
| 1111000101011010 | 4 | 0100 | 111100011011 |
|  |  | 0101 | 000000000000 |
| ⋮ | ⋮ | ⋮ | ⋮ |
|  |  | 1111 | 000000000000 |

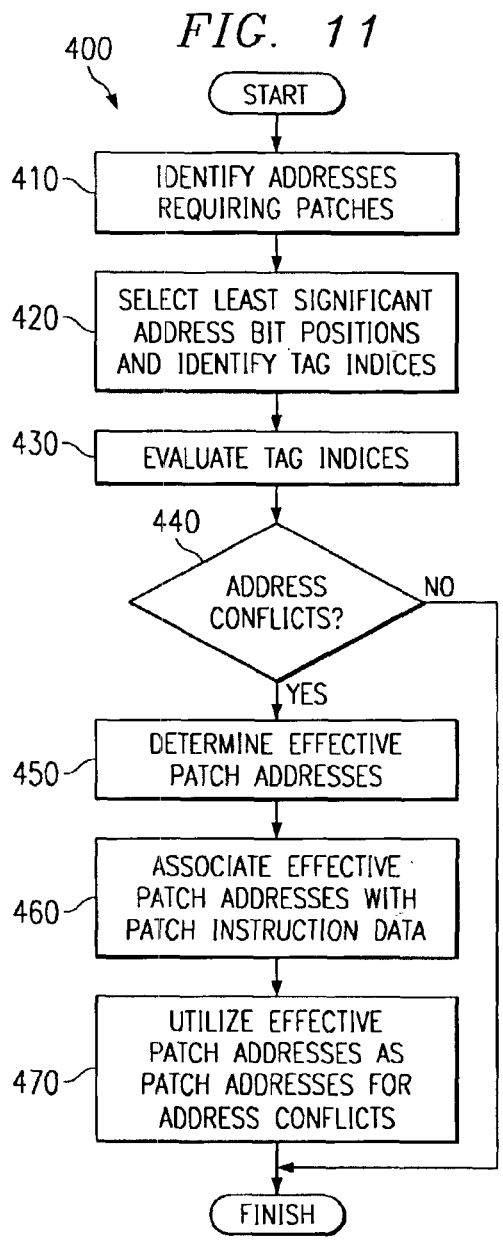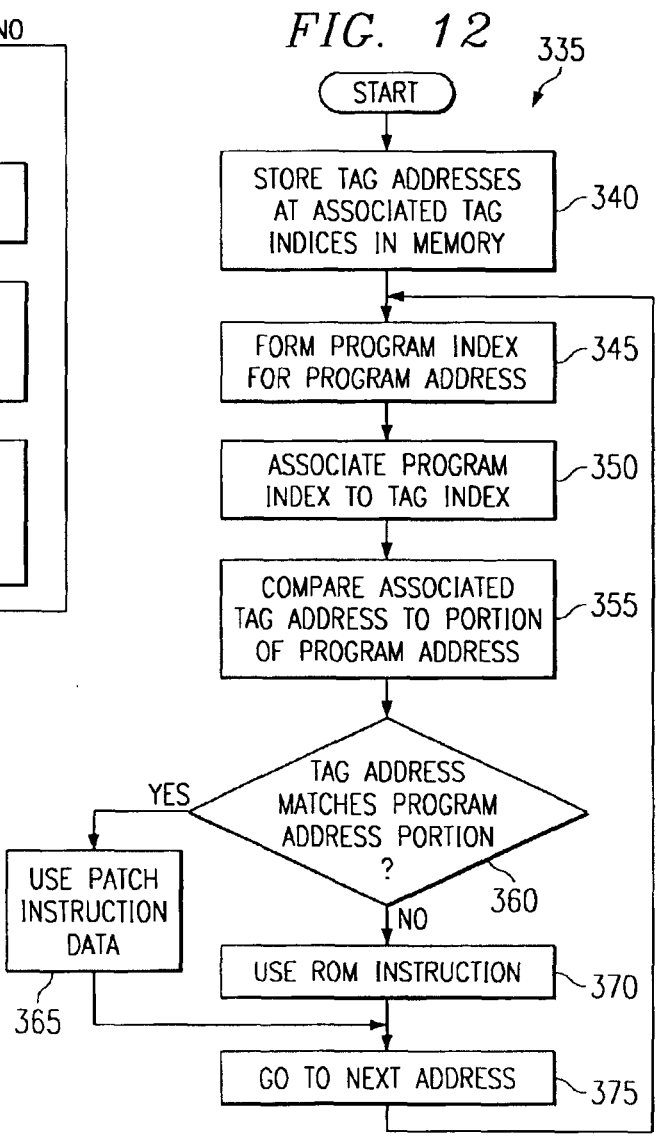

SCHEME FOR IMPLEMENTING BREAKPOINTS FOR ON-CHIP ROM CODE PATCHING

This application claims priority under 35 USC §119(e)(1) of provisional application Ser. No. 60/318,647, filed Sep. 10, 2001.

TECHNICAL FIELD OF INVENTION

The present invention relates generally to logic-type processing devices, and, more particularly, to a device and method for patching instructions stored in a read only memory (ROM) associated with a logic-type processing device.

BACKGROUND OF THE INVENTION

Logic-type processing devices, like microcontrollers, generally include a processor, such as a microprocessor, and one or more memories that store programs for execution by the processor. During operation, the processor sequentially executes instructions associated with any one of the programs to, for example, manipulate data, perform calculations, generate various output signals, or otherwise interact with hardware components to perform some predetermined function.

The memories used by processing devices are either read only memory (ROM), which can be read by the processor but to which the processor cannot write, or random access memory (RAM), which can be read by the processor and to which the processor can write. While RAM is more versatile in that it can be easily reprogrammed, RAM typically has a much larger footprint than ROM and is typically more expensive than ROM. Furthermore, many forms of RAM are volatile, which means that they must be refreshed on a periodic basis to prevent loss of the information stored therein. As a result, these RAMs are not suitable for storing information, such as programs, which must be retained upon powering-down of the processing device or upon a loss of power to the processing device. For these reasons, ROM is typically used to store programs that are central or essential to the operation of the logic device.

ROM can generally be characterized as being erasable or non-erasable. One type of erasable ROM is the erasable programmable read only memory (EPROM) which may be, for example, an electrically-erasable programmable read only memory (EEPROM), an ultraviolet erasable programmable read only memory (UV-EPROM), a flash memory and the like. Non-erasable ROM, such as masked ROM or ROM used in one-time-programmable (OTP) microcontrollers, are either manufactured with the program instructions or data stored therein or are capable of being programmed only once. While erasable ROM is more versatile than non-erasable ROM, erasable ROM is usually much more expensive than non-erasable ROM.

Due to its versatility, erasable ROM is typically used during the development of consumer products, such as cellular telephones, having processing devices therein, while cheaper non-erasable ROM is used in the final, mass produced product to reduce the cost of the product. In a typical case, a prototype product is provided with a processor and an erasable ROM. A product designer uses a personal computer or workstation to write code for the processing device and, when he or she is satisfied with the code, downloads the code to a device programmer. The device programmer then transfers the code to the erasable ROM, such as an EEPROM, which is then placed within the prototype product. Thereafter, testing of the code within the prototype product is performed and, if necessary, the erasable ROM is erased and reprogrammed multiple times during the development process. When testing is complete, the consumer product is mass produced using non-erasable ROM having the final version of the designed code burned or otherwise stored therein.

Generally speaking, the mass-produced version of a consumer product, such as a cellular telephone handset, includes one or more application specific integrated circuits (ASICs) or masked microcontrollers therein. ASICs are produced from specifications supplied by a purchaser, and typically have various components like processors, which may be, for example, digital signal processors, RAMs, ROMs and the like formed together in on single integrated circuit. As indicated above, the code used by the processor of the ASIC is typically stored in a masked ROM and, therefore, cannot be changed once the ASIC is manufactured. While there is a significant tooling charge (which may be tens or hundreds of thousands of dollars) associated with the production of an ASIC, the per unit cost of each component can still be very low when high volume production of the ASIC component is needed.

A major drawback associated with the use of an ASIC, a masked microcontroller or any other logic device that stores code in a non-erasable memory is the fact that the code is "hard wired" (not changeable) and thus, must be set at the time the logic device is produced. Because the tooling costs for ASICs are very high, it is undesirable to change the code within the ASIC after production of the ASIC has begun. Accordingly, many hours are typically spent testing code before a logic device that uses a non-erasable memory device to store that code is ordered. However, extensive testing can delay the release of a product using the logic device. Thus, the decision to release code for use in an ASIC comes down to a tradeoff between providing enough time to test the code and getting the ultimate product to market as soon as possible.

Once code is approved and released for use in a product, errors or "bugs" may be found in the released code. In some instances, while no "bugs" may be present within the code, it may be desirable to change some of the parameters of the code or to enhance the operation of the code in some manner. Of course, the decision to correct, optimize, add features or refine the code will result in the need to alter the code. However, making changes in the code within a product that is already released for manufacture requires replacing the non-erasable memories that store the code which, in turn, generates new tooling costs for the manufacture of new ASICs. This activity also delays final release or increases the cost of the product. Furthermore, if changes in the code are needed after the product has been placed on the market, the products which have already been sold may have to be recalled to have the ASICs therein replaced, which can be expensive. Methods of patching ROM code have been developed to reduce or eliminate the need to replace ROMs within ASICs or other devices. Customary patching methods, for example, detect the ROM address being read by a processor and, if a patch instruction is provided for that ROM address, the ROM is disabled and a patch memory is enabled, whereby a patch instruction is provided for the generated ROM address. Other methods of patching provide one or more fixed jump instructions within the ROM, whereby each of the jump instructions is configured to cause a jump to a specified location within a patch memory. If no patch is to be performed, the patch memory includes a jump instruction back to the ROM. If, however, a patch is to be performed, the patch memory includes a patch program which is executed before jumping back to the ROM. These patching methods, however, require an actual jump to the patch memory even when no patch is to be performed and, thus, use at least two jump instructions cycles at each jump location. Furthermore, these methods comprise a fixed jump location within the ROM, and because these methods typically cause jumps to predetermined and unchangeable locations within a patch memory, they limit the size of the patch program that can be performed at any particular jump location and use the patch memory inefficiently.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its purpose is to present some concepts of the invention in a simplified form as a prelude to the more detailed description that is presented later.

The present invention relates generally to a system and a method for preventing address conflicts when patching a code residing in ROM. The code comprises a plurality of program addresses and an associated plurality of program instructions, whereby each program address comprises a plurality of address bits located in a respective plurality of address bit positions. The method generally comprises identifying one or more of the plurality of program addresses which require patching, thereby defining one or more patch addresses. The address bits occupying the plurality of address bit positions of each patch address are evaluated, and a subset of the address bit positions is determined, thus defining index bit positions. The address bits occupying the index bit positions of each patch address further define a unique tag index for the respective patch address; consequently, address conflicts are avoided. The index bit positions are further stored in a tag programming memory, such as a tag programming register.

According to one exemplary aspect of the present invention, each tag index is a unique address location in a tag control memory such as a tag control RAM, wherein the tag index is associated with a tag address, and wherein the tag address comprises a predetermined portion of the patch address. A program index for each program address in ROM is formed based on the address bits occupying the index bit positions, and each program index is associated with a tag index in the tag control memory. The tag address associated with the tag index is further compared to a predetermined portion of the program address. If a match exists between the tag address and the predetermined portion of the program address, a breakpoint hit is identified, and the code is directed to patch instruction data. For example, the code is directed to patch instruction data residing in a patch memory via a software interrupt instruction, branch instruction, or high priority interrupt instruction. If a match does not exist between the tag address and the predetermined portion of the program address, for example, the code executes the instruction associated with the program address.

According to another exemplary aspect of the present invention, the index bit positions comprise a predetermined number of least significant address bit positions, whereby the address bits occupying the predetermined number of least significant address bit positions form the respective tag indices and program indices. If two or more tag indices comprise equivalent address bits, an address conflict exists, whereby two or more respective patch addresses form equivalent tag indices. In order to avoid the address conflict, for example, a breakpoint for the patch address which causes the address conflict can be moved up one or more program addresses immediately preceding the program address causing the address conflict, whereby program instructions associated with the one or more program addresses immediately preceding the program address causing the address conflict are executed in a patch instruction associated with the breakpoint. Moving the breakpoint for an address conflict, however, utilizes a slightly greater portion of patch memory, since the program instructions associated with the one or more program addresses immediately preceding the patch address must also reside in the patch memory.

According to another exemplary aspect of the present invention, the patch memory and tag control memory are portions of a single memory wherein a determination is made as to whether ROM or RAM is accessed by the code. If the ROM is accessed, a portion of the most significant bits of the program address is forced to a constant, thereby pointing to a location or region in the single memory wherein the tag indices and tag addresses residing in the tag control memory are located.

The present invention is also directed to a system for preventing address conflicts when applying patches to code residing in ROM. A tag programming memory operable to store one or more index bit positions is utilized to form a program index for a plurality of program addresses via a program index formation circuit. The program index formation circuit can comprise, for example, one or more multiplexors configured to select one or more respective address bits from the associated program address. A tag control memory (e.g., a tag control RAM) operable to store one or more tag addresses associated with one or more tag indices can be utilized by a comparison circuit, wherein each program index is associated with a tag index, and the tag address associated with the tag index is compared to a predetermined portion of the program address. Patch instruction data stored in a patch memory (e.g., a patch RAM) can be utilized by a breakpoint detection circuit when a program address which requires patching is identified. A software interrupt instruction, for example, can be selected by the breakpoint detection circuit to direct the code to the associated patch located in the patch memory if the tag address matches the predetermined portion of the program address. If the tag address does not match the predetermined portion of the program address, the breakpoint detection circuit can select the ROM code.

Alternatively, a single memory comprises the patch memory and the tag control memory. A RAM/ROM enable device operable to determine whether RAM or ROM is accessed at a program address can be employed to either check for a patch in RAM or to utilize an instruction in ROM, depending on the determination of the RAM/ROM enable device.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 11 illustrates a flow diagram methodology of preventing address conflicts when patching ROM code in accordance with the present invention.

FIG. 12 illustrates a flow diagram methodology of implementing a program index for preventing address conflicts when patching ROM code in accordance with the present invention.

DETAILED DESCRIPTION OF THE INVENTION

Figure 1:
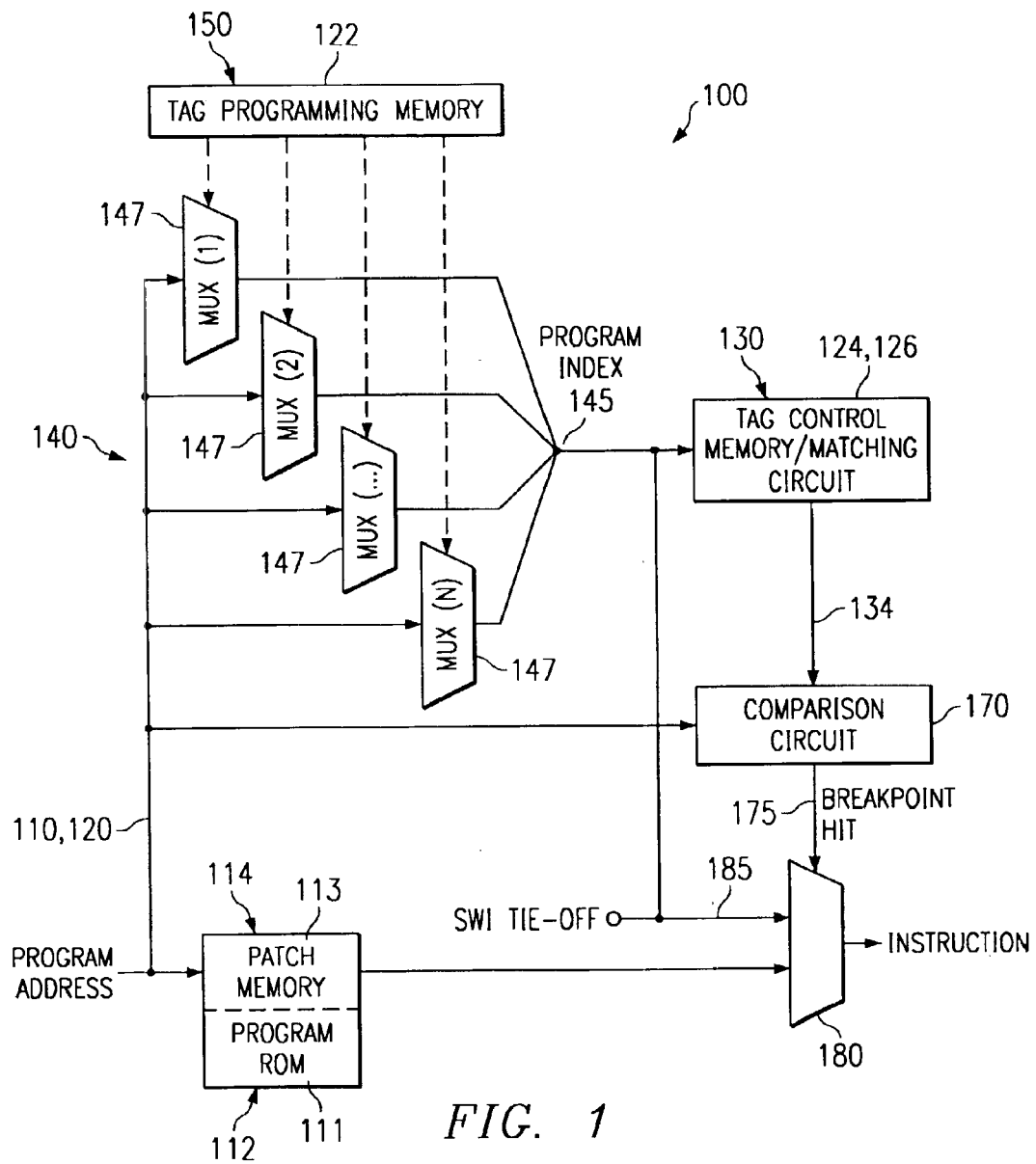
FIG. 1 is a block diagram illustrating a system for preventing address conflicts when patching ROM code in accordance with the present invention.

The present invention will now be described with reference to the drawings wherein like reference numerals are used to refer to like elements throughout. It should be understood that the description of these aspects are merely illustrative and that they should not be taken in a limiting sense. In the following description, for purposes of explanation, numerous specific details are set forth in order to provide a thorough understanding of the present invention. It will be evident to one skilled in the art, however, that the present invention may be practiced without these specific details.

The present invention is directed toward a system and a method for preventing address conflicts when determining breakpoints for applying one or more patches to code residing in a ROM device. FIG. 1 illustrates an exemplary system 100 for preventing address conflicts, wherein a plurality of program addresses 110 are associated with a respective plurality of program instructions 111 residing in a program ROM 112. One or more of the program addresses 110 respectively require a patch, thereby defining one or more patch addresses. Each patch address residing in ROM 112 is associated with one or more respective patch instructions 113 residing in a patch memory 114 (e.g., a patch RAM).

Figure 2:
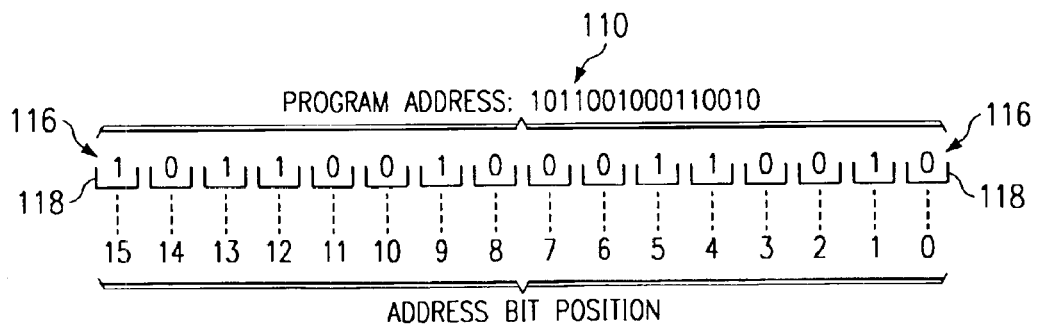
FIG. 2 is a chart illustrating an exemplary tag programming memory in accordance with the present invention.

Each program address 110 comprises a plurality of address bits located in a respective plurality of address bit positions. For example, FIG. 2 illustrates an exemplary program address 110 comprising sixteen binary address bits 116 located in sixteen address bit positions 118, respectively.

Figures 3, 4:
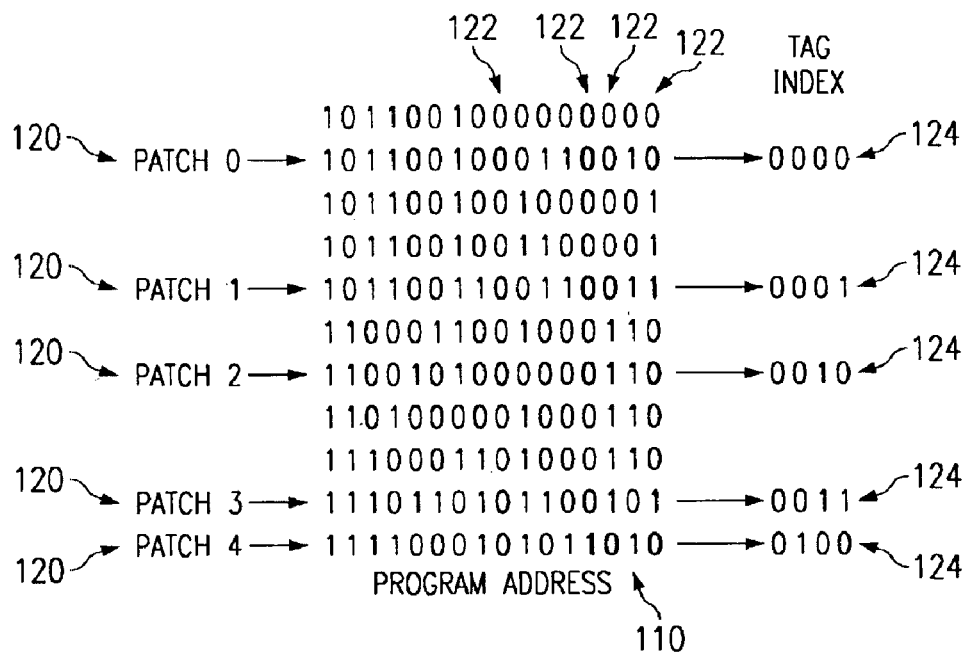
FIG. 3 is a chart illustrating a plurality of program address and exemplary tag indices associated with patch addresses in accordance with the present invention.
FIG. 4 is a chart illustrating an exemplary tag control memory associated with patch addresses as can be utilized in accordance with the present invention.

In accordance with one aspect of the present invention, the address bits 116 residing in the address bit positions 118 of each patch address are analyzed to determine a unique tag index for each respective patch address, whereby the tag index is designed to avoid an address conflict when applying the patches. Referring now to FIG. 3, according to one exemplary aspect of the present invention, one or more index bit positions 122 are predetermined, for example, by a human programmer such that the address bits 116 residing in the index bit positions 122 of each patch address 120 define a tag index 124 which uniquely identifies each patch address 120. That is, none of the tag indices 124 will be the same, for example, as illustrated by the five patch addresses 120 and associated 4-bit patch indices 124 in FIG. 3. The exemplary 4-bit tag indices 124 of FIG. 3 can identify up to sixteen patch addresses, however, only five patch addresses 124 are illustrated in order to simplify the example. Alternatively, if only three patches to the code were required, for example, a 2-bit tag index would suffice, whereby up to four patch addresses could be identified. The one or more index bit positions 122 can furthermore be predetermined by a computer-controlled analysis or other type analysis of each patch address 120.

Each tag index 124 is further associated with a predetermined portion of each respective patch address 120. The predetermined portion of each respective patch address 120 is defined as a tag address. Referring now to FIG. 4, in accordance with one exemplary aspect of the present invention, each tag address 126 comprises a remaining portion of the patch address 120 after the tag index 124 is removed from the patch address 120. According to another exemplary aspect, the predetermined portion of the patch address 120 comprises the entire associated patch address 120.

Referring again to FIG. 1, each tag address 126 associated with a tag index 124 and respective patch address 120 is stored in a tag control memory 130. The tag control memory 130 comprises, for example, a tag controller RAM. The tag control memory 130 may further comprise one or more null tag indices 132 which are associated with a respective tag index 124, as illustrated in FIG. 4. The null tag indices 132, however, are not associated with a patch address 120. Each null tag index 132 is associated with a null tag address 134, wherein the null tag address 134 comprises, for example, null data or some other predetermined data form.

Referring again to FIG. 1, in accordance with one exemplary aspect of the present invention, the system 100 further comprises a program index formation circuit 140 operable to form a program index 145 for each program address 110. The program index formation circuit 140 comprises, for example, N multiplexors 147, wherein each multiplexor 147 receives, as a control, a respective index bit position 122 from a tag programming memory 150. Each multiplexor 147 is further operable to select the particular address bit residing in the respective index bit position 122 of the program address 110, thereby forming the N-bit program index 145.

Figure 5:
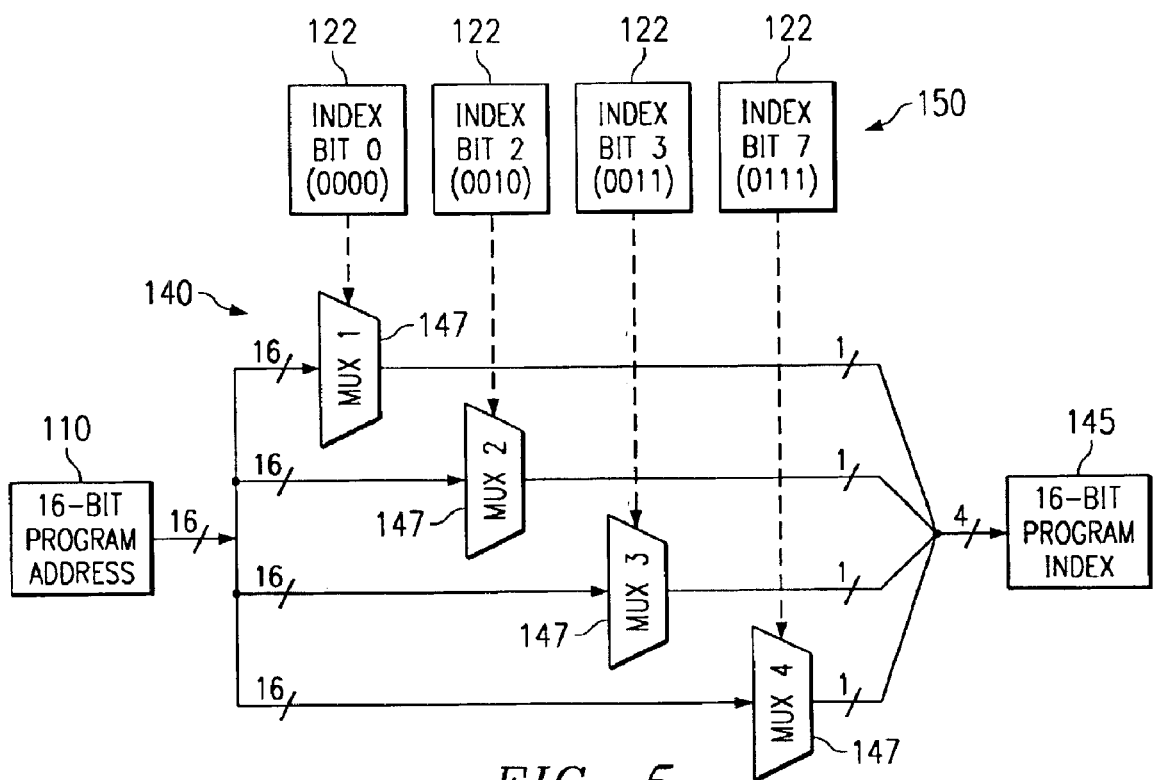
FIG. 5 is a block diagram illustrating a method of selecting a program index in accordance with the present invention.
Figure 6:
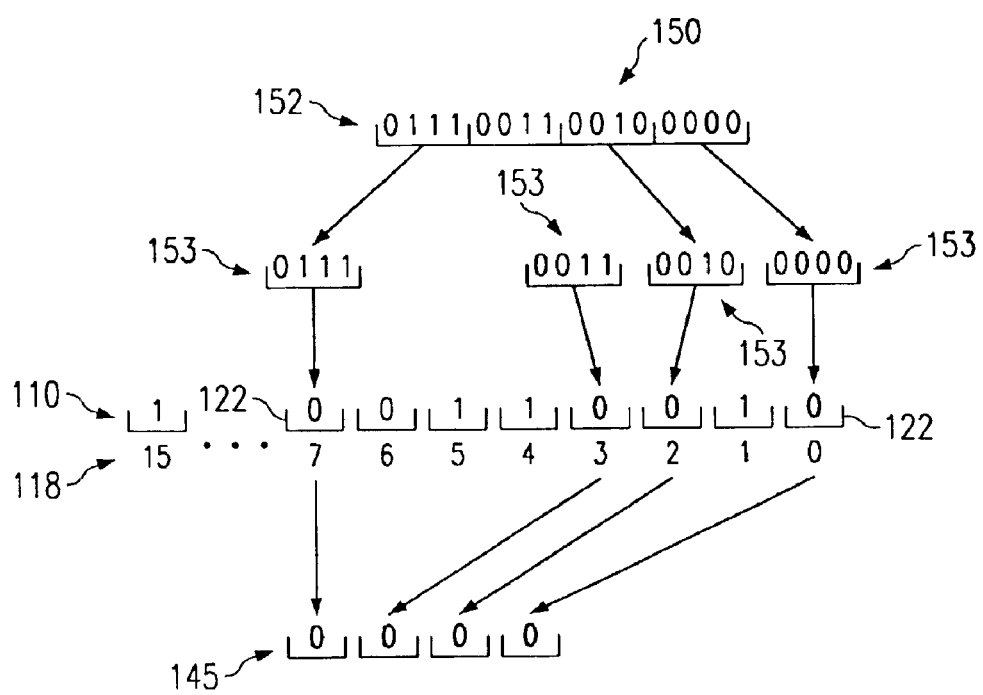
FIG. 6 is a diagram illustrating a determination of an exemplary program index in accordance with the present invention.

FIG. 5 pictorially illustrates an exemplary program index formation circuit 140, whereby four 16:1 multiplexors 147 select a 4-bit program index 145 from a sixteen-bit program address 110, wherein each multiplexor 147 receives a respective index bit position 122 as a control from the tag programming memory 150. The tag programming memory 150 comprises, for example, a 16-bit tag programming register, as illustrated in FIG. 6, and designated at reference numeral 152. The tag programming register comprises four binary 4-bit index fields 153 operable to identify four respective index bit positions 122 for each program address 110. The address bits 116 occupying each of the four index bit positions 122 form the 4-bit program index 145. The tag programming register 152 of FIG. 6, for example, is operable to select the $0^{th}$, $2^{nd}$, $3^{rd}$, and $7^{th}$ address bit positions 118 as index bit positions 122. In this example, the 4-bit program index 145 can allow up to sixteen possible combinations of address bits 116 to be formed. As will be understood by one of ordinary skill in the art, various combinations of tag programming register 152 and index field 153 size can provide a varying number of program indices 145, and such variations are contemplated as falling within the scope of the present invention.

Figure 7:
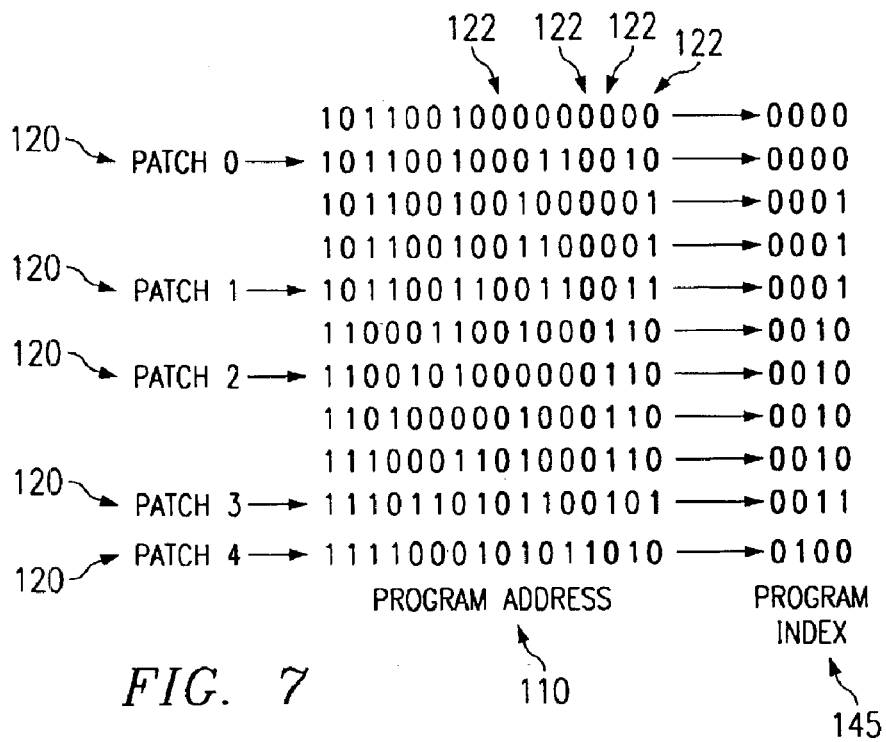
FIG. 7 is a chart illustrating a plurality of exemplary program addresses and program indices in accordance with the present invention.

Referring again to FIG. 1, the program index 145 for each respective program address 110 is further associated with a tag index 124. According to one exemplary aspect of the present invention, the program indices 145 are associated with a tag index 124 located in the tag control memory 130. FIG. 7 illustrates a plurality of program addresses 110 and the associated plurality of program indices 145 formed from the index bit positions 122 of each program address. Note that several program addresses 110 may be associated with a particular program index 145, however, only one patch address 120 is associated with each particular program index. That is, each tag index 145 is uniquely associated with a patch address to thereby eliminate the possibility of an address conflict. A comparison circuit 170 as illustrated in FIG. 1, therefore, is operable to compare the tag address 126 associated with each respective tag index 124 to a predetermined portion of the program address 110 as illustrated.

According one exemplary aspect of the present invention, the predetermined portion of the program address 110 comprises a remaining portion of the program address 110 after the program index 145 is removed therefrom. According to another exemplary aspect, the predetermined portion of the program address 110 comprises the entire program address 110. Whereas each program address 110 is associated with a tag index 124 via the associated program index 145, a match arising from the comparison of the tag address 126 and the predetermined portion of the program address 110 will only occur at a patch address 120. The match arising from the comparison of the tag address 126 and the predetermined portion of the patch address 120 is defined as a breakpoint hit 175.

A breakpoint detection circuit 180, as illustrated in FIG. 1, selects between the program instruction 111 associated with the respective program address 110 or a patch instruction path 185 based on the result of the comparison made by the comparison circuit 170. The breakpoint detection circuit 180 comprises, for example, a multiplexor with the breakpoint hit 175 as a control. If the breakpoint hit 175 does not exist (e.g., the signal is low), the breakpoint detection circuit 180 feeds the program instruction 111 through for processing. However, if a breakpoint hit 175 exists (e.g., the signal is high), a patch instruction path 185 associated with the patch address 120 is fed through for processing. The patch instruction path 185 comprises a link to the respective patch instruction 113 residing in the patch memory 114. According to one exemplary aspect of the present invention, the patch instruction path 185 comprises a software interrupt instruction, wherein a value/comment field of the software interrupt comprises the program index 145. The value/comment field further directs the code to a location in the patch memory 114 where the patch instruction 113 resides. According to another exemplary aspect, the patch instruction path 185 comprises a branch instruction, whereby the code is directed to a location in the patch memory 114 where a patch instruction 113 resides. According to yet another exemplary aspect of the invention, the patch instruction path 185 comprises a high priority interrupt instruction whereby the code is directed to a location in the patch memory 114 where a patch instruction 113 resides.

Figure 8:
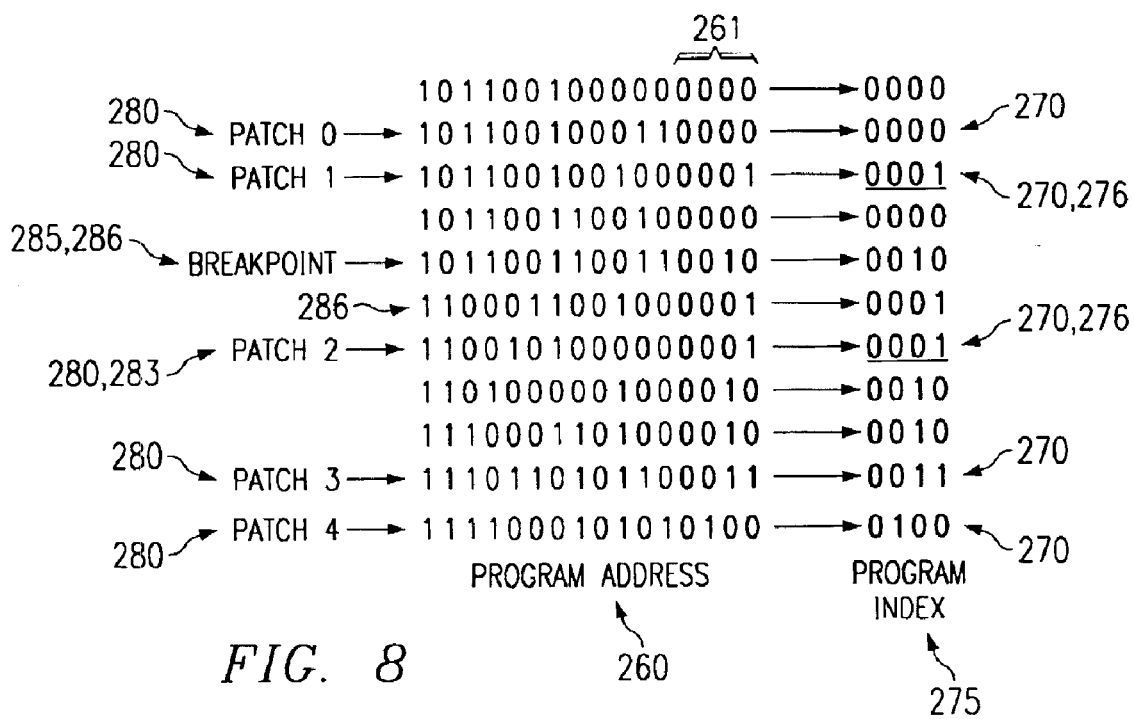
FIG. 8 is a chart illustrating a plurality of exemplary program addresses and program indices utilizing the least significant address bit positions in accordance with the present invention.

According to another exemplary aspect of the present invention, FIG. 8 illustrates a plurality of exemplary program addresses 260, wherein the index bit positions 261 comprise a predetermined number of least significant address bit positions 118 of FIG. 2 (e.g., the last four address bit positions), whereby the address bits 116 occupying the predetermined number of least significant address bit positions 118 form tag indices 270 and program indices 275 for the respective patch addresses 280 and program addresses 260 as illustrated in FIG. 8. If two or more patch addresses 280 form equivalent tag indices 276, an address conflict exists. In order to avoid the address conflict, an effective patch address 285 (i.e., a breakpoint) for the patch address 283 causing the address conflict can be defined, whereby the effective patch address 285 is substituted for the patch address 283 causing the address conflict. The effective patch address 285 effectively incorporates one or more program addresses 286 immediately preceding the patch address 283 causing the address conflict, whereby program instructions associated with the one or more program addresses 286 immediately preceding the patch address 283 causing the address conflict are added to a patch instruction associated with the effective patch address 285. Adding the program instructions associated with the one or more program addresses 286 to the patch instruction for the effective patch address 285, however, can utilize a slightly greater portion of patch memory, since the program instructions associated with the one or more program addresses immediately preceding the patch address 283 must also reside in the patch memory.

Figure 9:
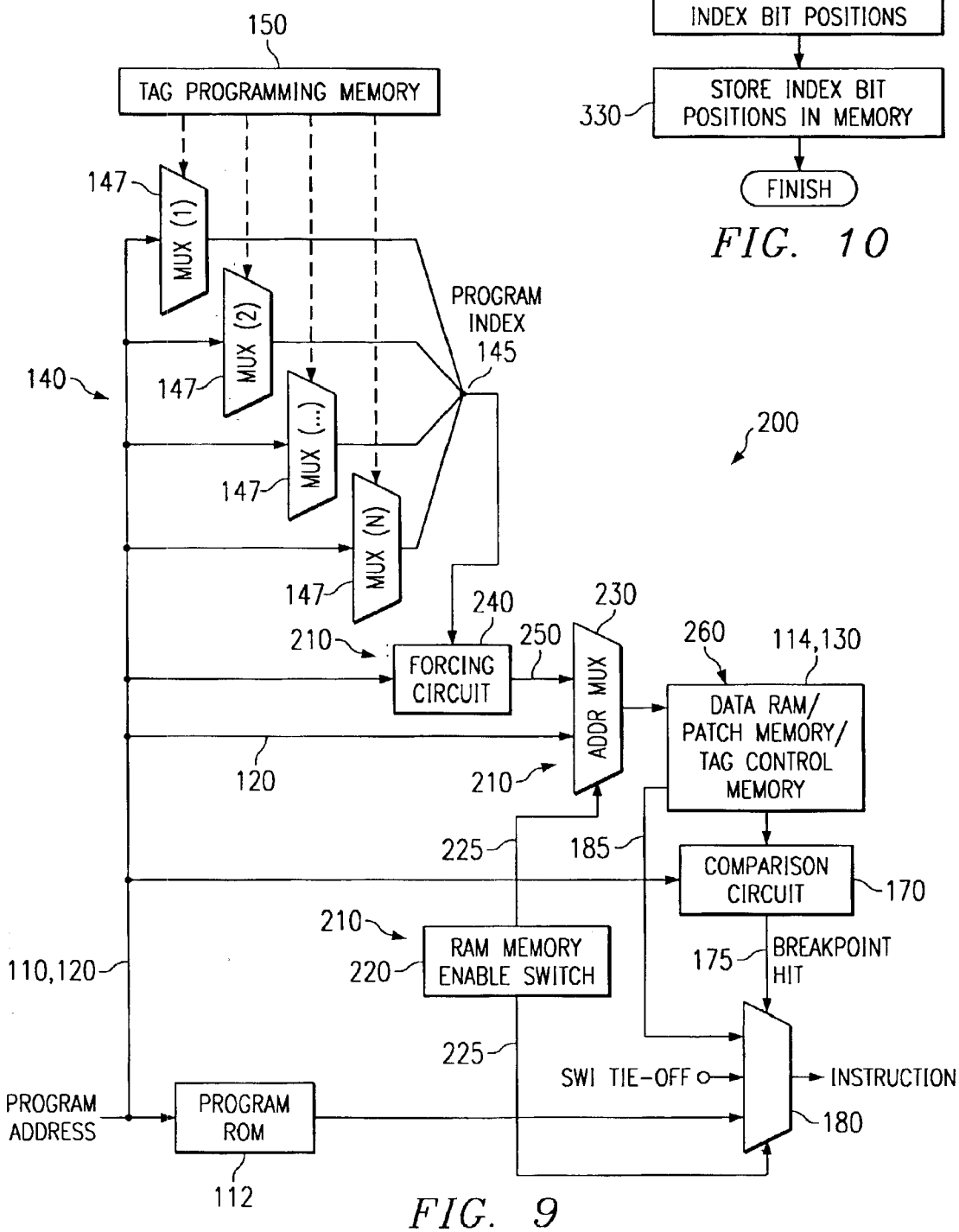
FIG. 9 is a block diagram illustrating a system for preventing address conflicts when patching ROM code using system RAM and a RAM/ROM enable circuit in accordance with the present invention.

In accordance with another exemplary aspect of the present invention, a RAM/ROM enable circuit is utilized to direct the code to the patch memory 114 if the program address 110 originates in the patch memory 114. For example, FIG. 9 illustrates an exemplary system 200 wherein a RAM/ROM enable circuit 210 is utilized as an additional input to the breakpoint detection circuit 180 in order to avoid a potential address conflict arising from a RAM address. Furthermore, a single memory, for example, comprises the tag control memory 130 and the patch memory 114. The RAM/ROM enable circuit 210 comprises, for example, a RAM memory enable switch 220, an address multiplexor 230, and a forcing circuit 240. The RAM memory enable switch 220 sends a signal 225 to the address multiplexor 230 and the breakpoint detection circuit 180 if the program address 110 currently being evaluated originated in the patch memory 114. If the program address 110 currently being evaluated originated in the patch memory 114, the address multiplexor 230 feeds the patch address 120 through for processing via line 185. If, however, the program address currently being evaluated originated in ROM 112, a forcing circuit 240 forces a portion of the most significant address bits of the program address 110 to a constant, thereby forming a tag control memory address 250. Furthermore, the address multiplexor 230 feeds the tag control memory address 250 to the tag control memory 130, wherein the analysis and functions highlighted in conjunction with FIGS. 1–7 are performed.

According to yet another exemplary aspect of the invention, a single memory 260 (e.g., a system RAM) comprises the patch memory 114 and the tag control memory 130. The tag control memory address 250 indicates a location (e.g., a region, sector, etc.) in the single memory 260 where the tag control memory 130 resides. One advantageous aspect of utilizing the single memory 260 is that a single memory typically requires less space to integrate on a circuit board, as opposed to utilizing separate spaces of the circuit board for the respective patch memory 114 and tag control memory 130. Furthermore, a single memory 260 allows sharing of a memory data space within the single memory, whereby when no patch is needed, the memory data space reserved for patches can be used for other purposes such as data memory.

The present invention is also directed toward a method of preventing address conflicts when establishing breakpoints and applying one or more patches to code residing in a ROM device. While exemplary methods are illustrated and described herein as a series of acts or events, it will be appreciated that the present invention is not limited by the illustrated ordering of such acts or events, as some steps may occur in different orders and/or concurrently with other steps apart from that shown and described herein, in accordance with the invention. In addition, not all illustrated steps may be required to implement a methodology in accordance with the present invention. Moreover, it will be appreciated that the methods may be implemented in association with the apparatus and systems illustrated and described herein as well as in association with other systems not illustrated.

Figure 10:
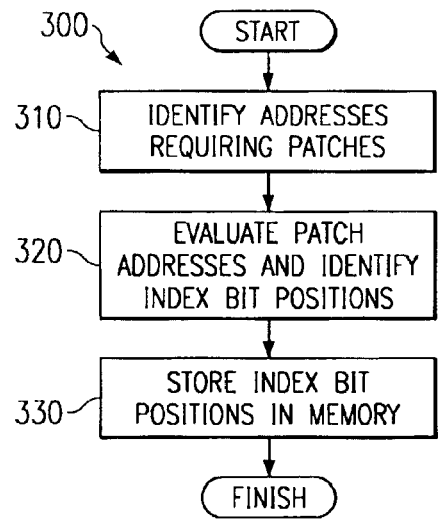
FIG. 10 illustrates a flow diagram methodology of selecting index bit positions for preventing address conflicts when patching ROM code in accordance with the present invention.
Figure 13:
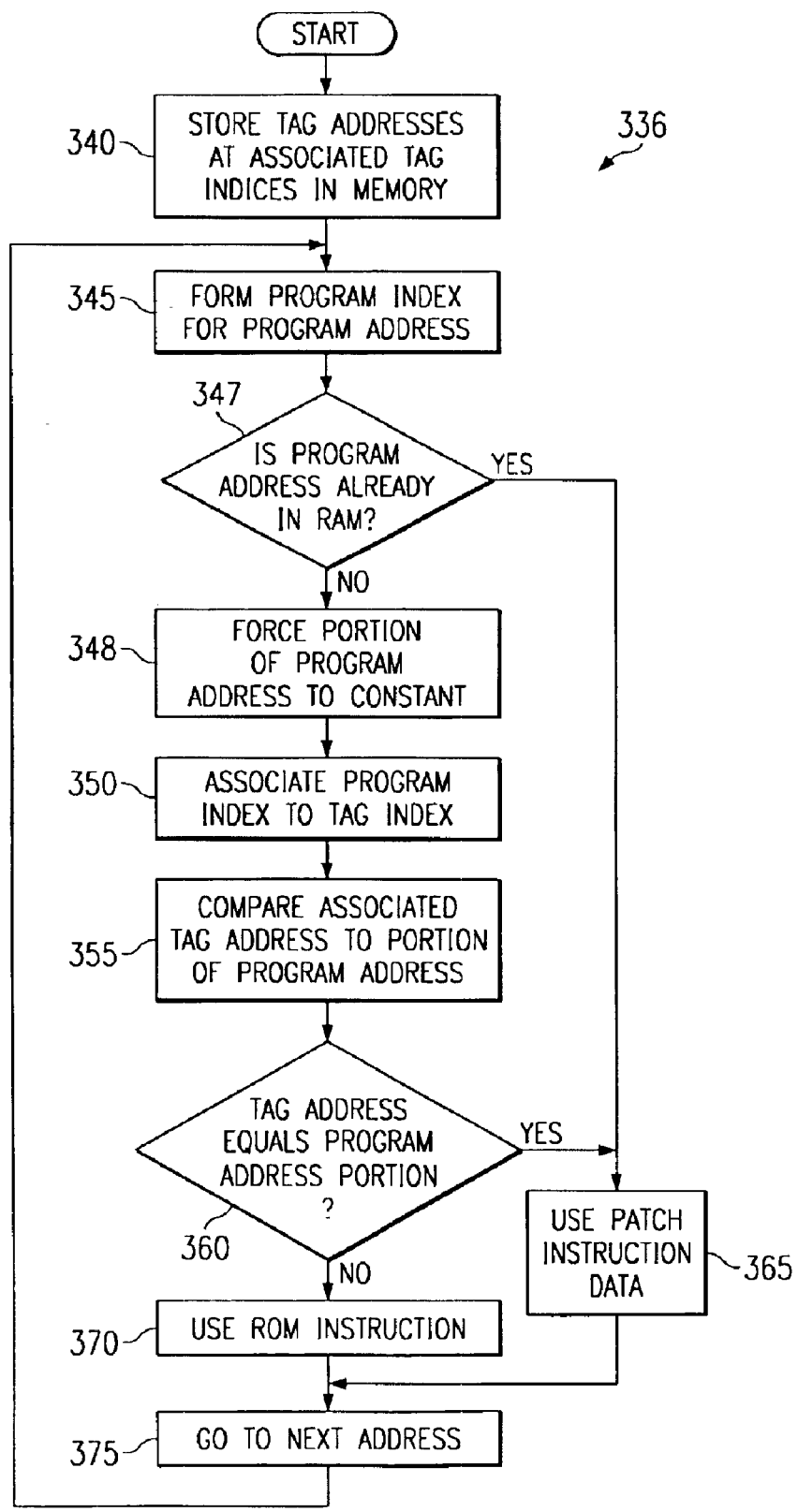
FIG. 13 illustrates a flow diagram methodology of implementing a program index and a RAM/ROM enable circuit for preventing address conflicts when patching ROM code in accordance with the present invention.

According to one exemplary aspect of the present invention, FIG. 10 illustrates a method 300 for preventing address conflicts when applying patches. The method 300 comprises identifying one or more of a plurality of program addresses which require patching at step 310, thereby defining one or more respective patch addresses. Each of the patch addresses also defines a breakpoint, wherein the code requires a jump to a patch instruction in memory. Each of the address bits comprising each respective patch address are then evaluated at step 320, wherein a subset of address bit positions are determined, thus defining one or more index bit positions. According to one aspect of the present invention, the criteria by which the subset of address bit positions determination is made is a selection of bit positions that will uniquely identify a patch, thus eliminating the possibility of an address conflict. The evaluation at step 320 can be performed either manually or automatically, for example, via computer-controlled analysis equipment. Furthermore, the index bit positions, for example, can be determined based on the significance of each address bit position in the program address. The address bits occupying the index bit positions define one or more unique tag indices associated with the one or more respective patch addresses. The one or more tag indices are further stored in a tag programming memory at step 330.

According to another exemplary aspect of the present invention, FIG. 11 illustrates another exemplary method 400 for preventing address conflicts when applying patches. The method 400 comprises identifying one or more of a plurality of program addresses which require patching at step 410, thereby defining one or more respective patch addresses. A least significant portion of the address bit positions are then selected as index bit positions at step 420, wherein the address bits residing in the index bit positions of each patch address are selected to comprise each respectively associated tag index. The tag indices are then evaluated at step 430, and a determination is made at step 440 as to whether more than one patch addresses are associated with the same tag index, thereby defining an associated address conflict. If an address conflict exists, an effective patch address is determined at step 450, wherein the effective patch address comprises a program address which precedes the patch address causing the address conflict, and wherein the effective patch address is associated with a tag index which uniquely identifies the program address. The effective patch address is the associated with and effective patch instruction data set at step 460, wherein the effective patch instruction data set comprises one or more program instructions associated with the effective patch address and each program address between the effective patch address and the patch address causing the address conflict. The effective patch address is further utilized as the patch address for the address conflict at step 470.

According to yet another exemplary aspect of the present invention, FIG. 11 further illustrates a method 335 of utilizing the tag indices identified, for example, in conjunction with FIG. 10 to direct code to patch instruction data. Step 340 illustrates storing one or more tag addresses associated with one or more respective tag indices in a tag control memory, such as a tag control RAM, wherein each tag address comprises a predetermined portion of the associated patch address. For example, the predetermined portion of a patch address may comprise address bits occupying a non-index portion of the portion of the patch address. A non-index portion of the patch address comprises the address bit positions of the program address which remain after removing the index bit positions from the patch address.

A program index is formed for each program address at step 345, wherein each program index is based on the address bits occupying each of the index bit positions of the respective program address. Step 350 indicates a step of associating the program index to a tag index in the tag control memory. The tag address associated with the tag index is then compared to a predetermined portion of the program address at step 355, and a determination is made at step 360 as to whether a match exists. If a match exists, the code is directed at step 365 to patch instruction data associated with the patch address, wherein the patch instruction data resides in a patch memory, for instance. The code is directed, for example, to an associated ROM instruction if a match does not exist at step 370. The code is then directed to the next program address at step 375, and steps 345 through 375 are repeated until the program is completed.

According to another exemplary aspect of the present invention, a single memory comprises the tag control memory and patch memory. According to yet another exemplary aspect of the present invention, FIG. 12 illustrates a method 336, wherein an additional step of determining whether ROM or RAM is accessed by the code is performed at step 347. Additionally, if the determination is made at step 347 that ROM is accessed, a portion of the most significant address bits are forced to a constant at step 348. The most significant address bits furthermore point to a location in the single memory, wherein the tag control memory resides. Steps 350 and 355 can then be carried out, wherein the program index is associated with a tag index, and the associated tag address is a compared to the predetermined portion of the program address. If the determination at step 347 that RAM is accessed, the code is directed to patch instruction data at step 365.

Although the invention has been shown and described with respect to certain aspects, equivalent alterations and modifications will occur to others skilled in the art upon the reading and understanding of this specification and the annexed drawings. In particular regard to the various functions performed by the above described components (systems, devices, assemblies, etc.), the terms used to describe such components are intended to correspond, unless otherwise indicated, to any component which performs the specified function of the described component (i.e., that is functionally equivalent), even though not structurally equivalent to the disclosed structure that performs the function in the herein illustrated exemplary aspects of the invention. In addition, while a particular feature of the invention may have been disclosed with respect to only one of several aspects, such feature may be combined with one or more other features of the other aspects as may be desired and advantageous for any given or particular application. Furthermore, to the extent that the term "includes" is used in either the detailed description and the claims, such term is intended to be inclusive in a manner similar to the term "comprising."

What is claimed is:

1. A method for preventing address conflicts when establishing breakpoints and applying one or more patches to code residing on a read only memory (ROM) device, the code comprising a plurality of program addresses associated therewith, whereby each program address comprises a plurality of address bits occupying a respective plurality of address bit positions, the method comprising the steps of:
    identifying one or more of the plurality of program addresses which require patching, thereby defining one or more respective patch addresses associated with a respective one or more breakpoints;
    evaluating the address bits of the patch addresses and determining a subset of the address bit positions, thereby defining index bit positions, wherein the address bits occupying the index bit positions define one or more unique tag indices associated with the one or more respective patch addresses; and
    storing the index bit positions in a tag programming memory.

2. The method of claim 1, wherein the index bit positions are determined based on the significance of each address bit position in the program addresses.

3. The method of claim 1, wherein the tag programming memory comprises a tag programming register.

4. The method of claim 1, further comprising:
    storing one or more tag addresses associated with the one or more tag indices in a tag control memory, wherein each associated tag address comprises a predetermined portion of the associated patch address;
    forming a program index for each program address of the code based on the address bits occupying each of the index bit positions of the respective program address;
    associating each program index to a tag index;
    comparing the tag address associated with the tag index for each associated program index to a predetermined portion of the program address; and
    directing the code to patch instruction data associated with the patch address if the predetermined portion of the program address matches the tag address.

5. The method of claim 4, wherein the predetermined portion of the program address comprises address bits occupying a non-index portion of the program address, and wherein the non-index portion of the program address comprises the address bit positions of the program address which remain after removing the index bit positions from the program address.

6. The method of claim 5, wherein the predetermined portion of the patch address comprises address bits occupying a non-index portion of the patch address, and wherein the non-index portion of the patch address comprises the address bit positions of the patch address which remain after removing the index bit positions from the patch address.

7. The method of claim 4, wherein the predetermined portion of the program address comprises the entire program address.

8. The method of claim 7, wherein the predetermined portion of the patch address comprises the entire patch address.

9. The method of claim 4, wherein the tag control memory comprises a tag control random access memory (RAM).

10. The method of claim 4, wherein the patch instruction data is stored in a patch memory.

11. The method of claim 10, wherein the patch memory comprises a patch RAM.

12. The method of claim 4, wherein the code is directed to the associated patch instruction data via a software interrupt (SWI) instruction.

13. The method of claim 12, wherein the code is directed to the associated patch instruction data using a value/comment field of the SWI instruction.

14. The method of claim 4, wherein the code is directed to the associated patch instruction data via a branch instruction or a high priority interrupt instruction.

15. The method of claim 4, further comprising directing the code to ROM if the predetermined portion of the program address and tag address do not match.

16. The method of claim 4, wherein the tag control memory and the patch memory are portions of a single memory.

17. The method of claim 16, further comprising:
    determining whether ROM or RAM is accessed by the code; and
    forcing a portion of the most significant address bits of the program address to a constant if ROM is accessed, thereby pointing to a location in the single memory wherein the tag control memory resides.

18. The method of claim 17, wherein if RAM is accessed, the program address is directed to the patch instruction data.

19. A method for preventing address conflicts when establishing breakpoints and applying one or more patches to code residing on a read only memory (ROM) device, the code comprising a plurality of program addresses associated therewith, whereby each program address comprises a plurality of address bits occupying a respective plurality of address bit positions, the method comprising the steps of:
    identifying one or more of the plurality of program addresses which require patching, thereby defining one or more respective patch addresses associated with a respective one or more breakpoints;
    selecting a predetermined number of least significant address bit positions of the patch addresses, thereby defining index bit positions, wherein the address bits occupying the index bit positions define one or more tag indices associated with the one or more respective patch addresses;
    evaluating the one or more tag indices and determining if more than one patch addresses are associated with the same tag index, thereby defining an associated address conflict;
    determining an effective patch address preceding the address conflict wherein the effective patch address comprises a program address associated with a tag index which uniquely identifies the program address;

associating the effective patch address with an effective patch instruction data set, the effective patch instruction data set comprising one or more program instructions associated with the effective patch address and each program address between the effective patch address and the address conflict; and utilizing the effective patch address as the patch address for the address conflict.

20. The method of claim 19, further comprising:

storing one or more tag addresses associated with the one or more tag indices in a tag control memory, wherein each associated tag address comprises a predetermined portion of the associated patch address;

forming a program index for each program address of the code based on the address bits occupying each of the index bit positions of the respective program address;

associating each program index to a tag index;

comparing the tag address associated with the tag index for each associated program index to a predetermined portion of the program address; and directing the code to patch instruction data associated with the patch address if the predetermined portion of the program address matches the tag address.

21. The method of claim 19, wherein the predetermined portion of the program address comprises address bits occupying a non-index portion of the program address, and wherein the non-index portion of the program address comprises the address bit positions of the program address which remain after removing the index bit positions from the program address.

22. The method of claim 21, wherein the predetermined portion of the patch address comprises address bits occupying a non-index portion of the patch address, and wherein the non-index portion of the patch address comprises the address bit positions of the patch address which remain after removing the index bit positions from the patch address.

23. The method of claim 19, wherein the predetermined portion of the program address comprises the entire program address.

24. The method of claim 23, wherein the predetermined portion of the patch address comprises the entire patch address.

25. The method of claim 19, wherein the tag control memory comprises a tag control random access memory (RAM).

26. The method of claim 19, wherein the patch instruction data is stored in a patch memory.

27. The method of claim 26, wherein the patch memory comprises a patch RAM.

28. The method of claim 19, wherein the code is directed to the associated patch instruction data via a software interrupt (SWI) instruction.

29. The method of claim 28, wherein the code is directed to the associated patch instruction data using a value/comment field of the SWI instruction.

30. The method of claim 19, wherein the code is directed to the associated patch instruction data via a branch instruction or a high priority interrupt instruction.

31. The method of claim 19, further comprising directing the code to ROM if the predetermined portion of the program address and tag address do not match.

32. The method of claim 19, wherein the tag control memory and the patch memory are portions of a single memory.

33. The method of claim 32, further comprising:

determining whether ROM or RAM is accessed by the code; and forcing a portion of the most significant address bits of the program address to a constant if ROM is accessed, thereby pointing to a location in the single memory wherein the tag control memory resides.

34. The method of claim 33, wherein if RAM is accessed, the program address is directed to the patch instruction data.

35. A system for preventing address conflicts when applying patches to code, the code comprising a plurality of program addresses residing on a read only memory (ROM) device, the system comprising:

a patch memory operable to store patch instruction data associated with one or more program addresses which require patching, wherein the one or more program addresses which require patching define one or more respective patch addresses;

a tag control memory operable to store one or more tag addresses associated with one or more tag indices, wherein each tag address and associated tag index are associated with a respective patch address;

a tag programming memory operable to store one or more index bit positions of the plurality of program addresses;

a program index formation circuit operable to form a program index by selecting one or more address bits respectively residing in the one or more index bit positions of each program address, wherein the program index is associated with a tag index;

a comparison circuit operable to compare a predetermined portion of each program address to the respective tag address associated with the tag index; and a breakpoint detection circuit operable to direct the code to the patch memory if the predetermined portion of the program address matches the associated tag address.

36. The system of claim 35, wherein the patch memory comprises a patch RAM.

37. The system of claim 35, wherein the tag control memory comprises a tag control RAM.

38. The system of claim 35, wherein the tag programming memory comprises a tag programming register.

39. The system of claim 35, wherein the program index formation circuit comprises one or more multiplexors operable to select the one or more address bits.

40. The system of claim 35, wherein each of the one or more multiplexors are operable to select an address bit associated with a unique index bit position, wherein each of the selected address bits form the program index, and wherein the unique index bit positions are selected to prevent an address conflict.

41. The system of claim 35, wherein the breakpoint detection circuit comprises a multiplexor operable to select between a patch code in the patch memory and the code in the ROM device.

42. The system of claim 35, wherein the code is directed to the patch memory via a software interrupt (SWI) instruction, branch instruction, or high priority interrupt instruction.

43. The system of claim 35, wherein the patch memory and the tag control memory are portions of a single memory.

44. The system of claim 35, further comprising a RAM/ROM enable circuit operable to direct the code to the patch memory if the program address originates from the patch memory.

45. The system of claim 44, wherein the RAM/ROM enable circuit comprises a multiplexor operable to select between the program index and the program address.

* * * * *